Dec. 24, 1968        P. SPERGEL ET AL        3,418,474
PANORAMIC RADIATION DETECTOR HAVING A MULTIPLICITY
OF ISOLATED GAS CHAMBERS
Filed Nov. 9, 1965                        4 Sheets-Sheet 1

INVENTORS
Philip Spergel,
James V. De Roses &
Raymond P. Grenier
Morse, Altman, & Oates
ATTORNEYS

United States Patent Office 3,418,474
Patented Dec. 24, 1968

3,418,474
PANORAMIC RADIATION DETECTOR HAVING A MULTIPLICITY OF ISOLATED GAS CHAMBERS
Philip Spergel, Lexington, James V. Di Rocco, Winchester, and Raymond P. Grenier, Wilmington, Mass., assignors to Baird-Atomic, Inc., Cambridge, Mass., a corporation of Massachusetts
Filed Nov. 9, 1965, Ser. No. 507,005
15 Claims. (Cl. 250—83.6)

ABSTRACT OF THE DISCLOSURE

A radiation detector array is provided with a multiplicity of identical, substantially isolated, minute chambers, each having an electrically conducting wall and an electrically conducting pin, the chambers communicating with each other through ports and containing an ionizable gas, a readout matrix being associated with the pins to indicate any pin of the plurality which conducts as a result of radiation incident to its chamber.

---

The present invention relates to radiation detection and, more particularly, to an array of gas detectors capable of providing indications of atomic events at particular points in a relatively large area with high detection sensitivity and high spatial resolution.

By way of example, a typical radioactivity detection technique is illustrated by chromatographic paper containing dispersed concentrations of radioactivity associated with small sites of "tagged" chemical materials. The identity of such a chemical material is indicated by the character of the radioactivity with which the chemical material has been tagged. Such sites are flowed into various positions on the paper by capillary action from a solution into which an edge of the paper is dipped. Typically the paper contains radioactive sites of sizes ranging from one square millimeter to approximately 100 square millimeter. The amount of radioactivity at any site is approximately proportional to its area. The radioactivity and relative isolation of the sites allow their spatial positions and geometrical configurations to be determined by a panoramic detector. In the past, the most widely used technique of locating high concentrations of radioactivity in a plane distribution has been exposure to X-ray film. The primary advantages of X-ray film are low cost and high resolution. The primary disadvantages of X-ray film are low sensitivity and qualitative rather than quantitative presentation of data.

The primary object of the present invention is to provide a planar array of gas detectors that are sufficiently small and closely packed to provide high spatial resolution and that are provided with virtually identical mechanical structure and gas pressure to achieve uniformly high sensitivity. The array of gas detectors is established by: a medial electrically conducting portion having an array of cylindrical apertures therethrough; an electrically non-conducting portion at the rear face of the medial portion supporting an array of conducting projections axially located within the apertures of the medial portion; a forward portion serving as window for radioactive emanations, particulate or electromagnetic, into the array; and a gas confined within the array. The gas within the array of apertures is at the identical pressures throughout the array because the apertures communicate with each other through suitable conduits. The electrically isolated detectors established by the foregoing structure are such that a radioactive emanation incident through the window causes a momentary discharge of the gas in one of the chambers between the projection, which serves as an anode, and the wall of the aperture, which serves as a cathode.

Another object of the present invention is to provide a readout system for an array of detectors of the foregoing type, wherein rows and columns of the array of detectors are associated with a matrix of electrical leads, and suitable amplifying electronics. By virtue of the ability of a pulse in one of the detectors to provide only the electrical lead of a particular row and only the electrical lead of a particular column with a common signal, it is possible to avoid an amplifier for each individual detector.

Other objects of the present invention will in part be obvious and will in part appear hereinafter.

The invention accordingly comprises the apparatus possessing the features, properties, and relations of components that are exemplified in the following disclosure, the scope of which will be indicated in the appended claims. For a fuller understanding of the nature and objects of the present invention, reference should be had to the following detailed description taken in connection with the accompanying drawings, wherein:

Figure 1:
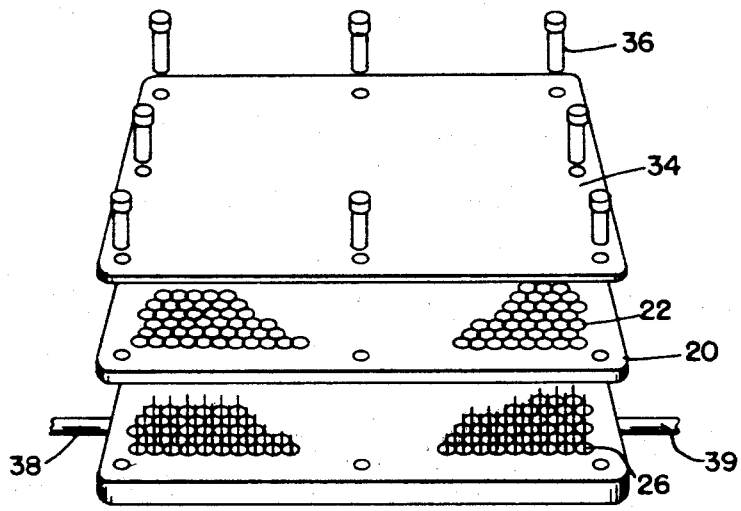
FIG. 1 is an exploded view of components of a detector array embodying the present invention.
Figure 2:
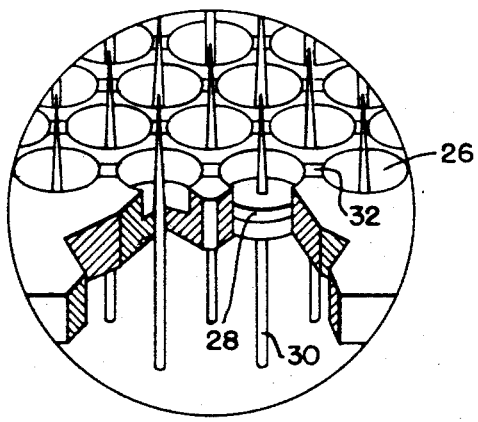
FIG. 2 is an enlarged view, partly broken away, of one of the components of the detector array of FIG. 1.

Generally, the detector of FIG. 1 is shown as comprising an electrically conducting, metallic, medial plate 20 having therethrough a plurality of openings 22, each of which is cylindrically developed about an axis that is perpendicular to the parallel faces of plate 20. At the rearward face of plate 20 is an electrically non-conducting, plastic plate 24 which is provided with a multiplicity of depressions 26, the cylindrical walls of which are developed about the same axis as are the cylindrical walls of apertures 22. Projecting through the seat 28 of each depression 26, as shown in FIG. 2, is an electrically conducting metallic needle 30, of which the rearward extremity provides a connecting terminal and the forward extremity, in the form of a sharp point, provides a discharge terminal. It will be noted that depressions 26 all are interconnected by ports 32 in rearward plate 24. At the forward face of medial plate 20 is a relatively thin plate 34 in the form of a sheet of aluminum or the like which is capable of transmitting radiation without appreciable attenuation. Forward plate 36 lies flat against the forward face of medial plate 20. Each of rearward plate 24, medial plate 20 and forward plate 34 is provided along its periphery with apertures for the reception of a plurality of bolts 36, by which the plates are retained in assembled condition. When in assembled condition, apertures 22 and depressions 26 are aligned, with needles 30 projecting along their axes. A gas, introduced through gas inlet 38 and exhausted through a gas outlet 39, uniformly permeates all of the minute detectors formed in the assemblage in order to establish a gas discharge path for electrical arcing between the needle 30 and the associated wall of plate 20 of any particular detector that is energized by incident radiation. In practice, the spatial resolution of the detector mosaic is limited only by the smallest diameter gas detector that will provide reliable counter operation.

In a typical example, a planar array, generally 5 x 5 inches in longitudinal and transverse extent, is provided with an array of 492 detectors, each 3/16 inch in diameter and 1/4 inch in depth. Alternatively, in the same area, an array of 746 detectors consists of cylindrical counters 3/16 inch in diameter in a hexagonal packing with 13/64 inch between centers, leaving walls of 1/64 inch in thickness. Larger arrays, for example, 8 x 10 inch areas also can be built, for example, with 2233 detectors, each of which is 3/16 inch in diameter. The latter higher density packing of detectors is such that 77.3% of the area is covered with a spatial resolution of 3/16 inch.

Medial plate 20, which provides the cylindrical cathodes of the array of detectors, is formed simply by drilling holes in a slab of metal. Medial plate 20 typically is 1/4 inch thick. Preferably the metal slab is composed of a heavy metal such as lead, which shields each detector from adjacent detectors, but is alternatively composed of another metal such as aluminum, copper, brass, stainless steel, etc. Needles 30, which constitute anodes that are electronically isolated from each other by insulating rearward sheet 24, typically are composed of stainless steel. The detectors are operated in the Geiger region for reasons of simplicity in electronic circuitry. The small size of the detectors decreases the dead time to a value of approximately 10 microseconds for the operation of the Geiger region. The entire array is operated from a single power supply at a single voltage and at a single pressure from a single gas supply. The spread in efficiency of the different detectors for beta particles is less than five percent in practice. The gas may be either statically sealed within the detector array or may be flowed continuously through the detector array. In static system, the gas pressure preferably ranges from one centimeter of mercury to 100 atmospheres and in a flow system, the gas pressure preferably is approximately atmospheric. The flow system is applicable particularly to charged particle detection but is applicable also to gamma ray detection, where maximum efficiency is not essential. The static system, at high pressure is applicable particularly to gamma ray detection where maximum efficiency is desired. Generally, the gas includes any of the common Geiger gas mixtures, for example, an inert gas such as argon to which is added a small amount of a polyatomic gas such as isobutane. Preferably, the gas mixture is flowed through the mosaic at a steady rate in order to ensure uniform pressure throughout the mosaic. Forward plate 34 is a thin sheet of a metal such as aluminum or a metallized plastic such as aluminized Mylar ranging in thickness from 1/16 to 1/8 inch. The needles protruding through depressions 26 cause the gas to diffuse to every detector chamber uniformly.

Figure 3:
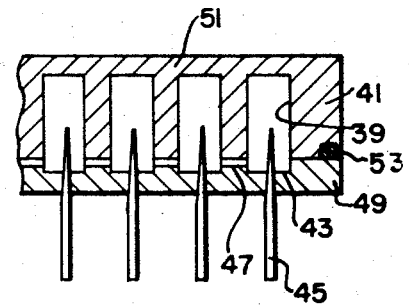
FIG. 3 is an enlarged view, partly broken away, of an alternative detector array embodying the present invention.

In the alternative detector array of FIG. 3, the detector walls are provided by apertures 39 in a conducting plate 41 and the seats 43 for needles 45 and communicating ports 47 for a suitable static or flowed gas are provided in a nonconducting plate 49, all similar to their counterparts in FIGS. 1 and 2. The window 51, however, at the forward face of plate 41, is integral therewith, being carefully retained when apertures 39 are drilled only partly through plate 41. An O-ring gasket 53 is provided as a seal for the detector array in the case of a static gas system under greater than atmospheric pressure.

Figure 4:
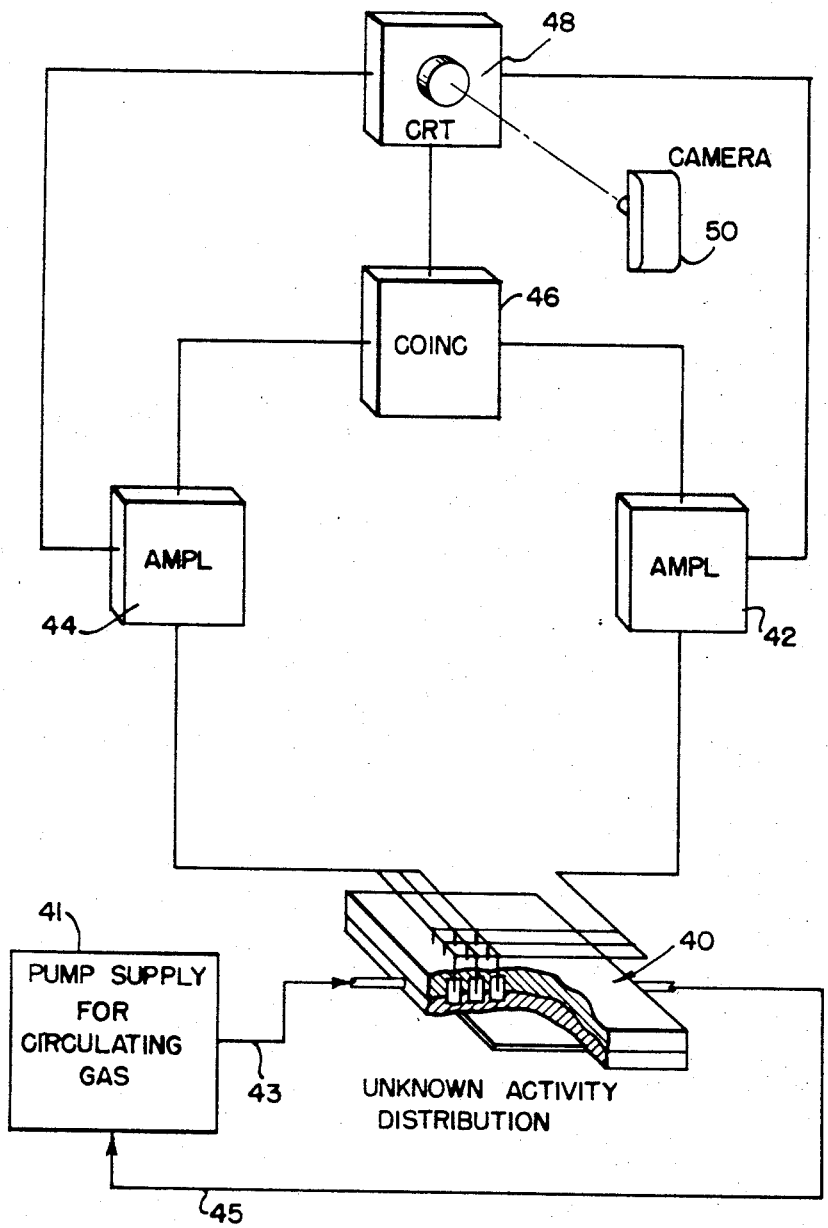
FIG. 4 is a block diagram of a system embodying the present invention, illustrating the detector array in operation.

In the block diagram of FIG. 4, the detector array, generally shown at 40, is shown in contiguity with a thin chromatographic film 42. A supply and pump 41 continuously circulate the gas through the detectors via input conduit 43 and output conduit 45. When a particular detector in array 40 detects an event, its location is determined in the following way. Each row of the array is connected to an amplifier, all amplifiers of all rows being shown at 42. Likewise, each column of the array is connected to an amplifier, all amplifiers of all columns being shown at 44. A coincidence at a particular row and a particular column, as detected by a coincidence circuit 46, uniquely determines th ecoordinates of any detector in the array. The separate outputs of the rows the columns are voltage pulses, the heights of which are proportional to the coordinates of the rows and columns. These outputs drive the vertical and horizontal plate of a cathode ray tube 48 in such a way that an event that occurs in a detector with $x$ and $y$ coordinates deflects the beam of the cathode ray tube to a corresponding $x$, $y$ position on the cathode ray tube face. The cathode ray tube face is monitored by a suitable television or photographic camera 50.

Figure 5:
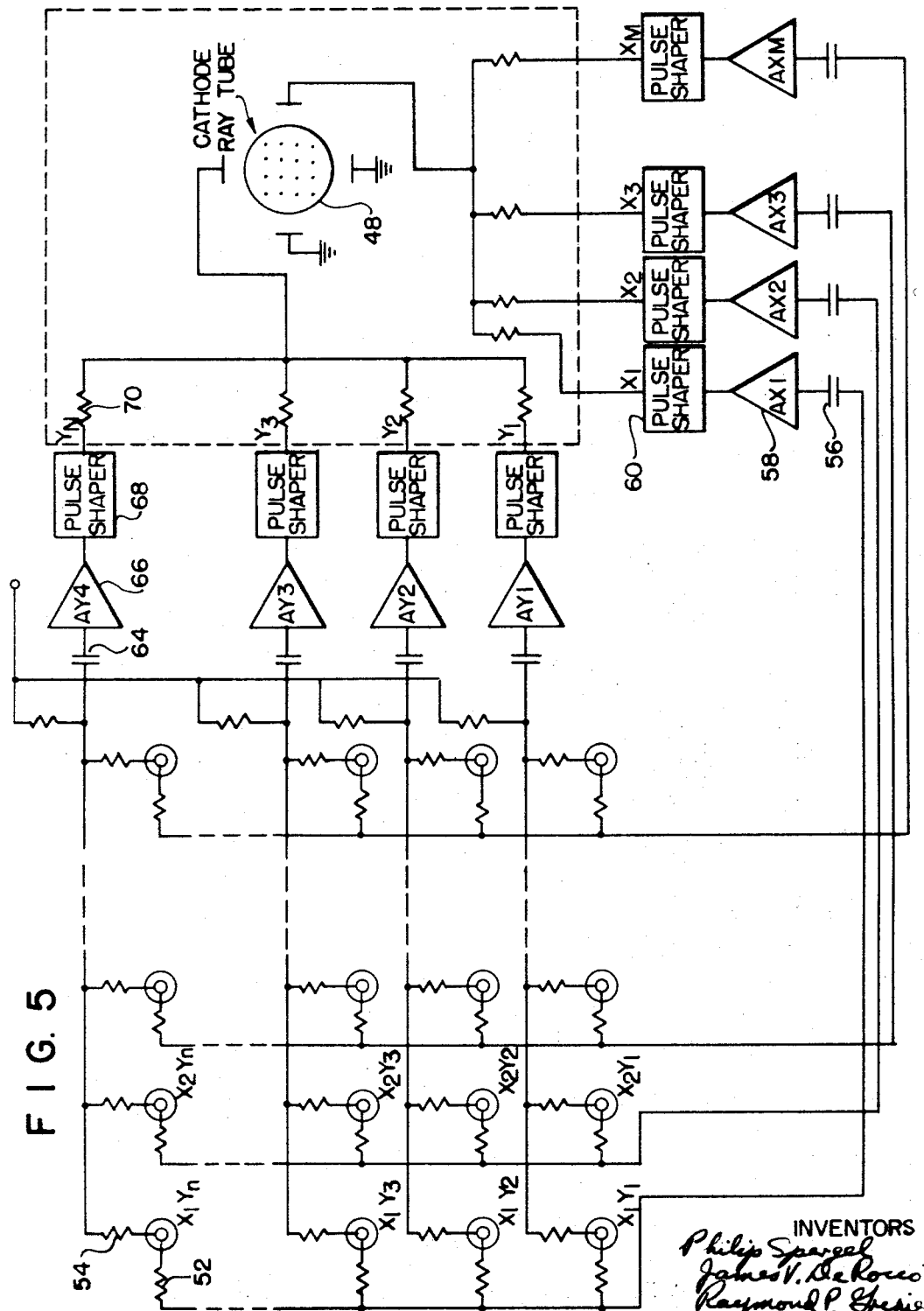
FIG. 5 is an electrical schematic of a part of the system of FIG. 3.

One specific embodiment of amplifiers 42, 44 and coincidence circuit 46 is shown in FIG. 5. The individual detectors are arranged in rows and columns, their positions in the rows being designated $x_m$ and their positions in the columns being designated by $y_n$. In each detector, the anode is connected to two resistors 52, 54, the former resistor being designated $R_x$ and the latter being designated $R_y$. All of the $R_x$ resistors in a column are connected through a suitable coupling capacitor 56 to an amplifier 58. The series of such amplifiers is designated in the drawing as $Ax_1$, $Ax_2$ . . . $Ax_m$. The output of amplifiers 58 are directed through a series of pulse shapers 60 and a series of resistors 62 to the horizontal deflection plates of cathode ray tube 48. Each of resistors 62 is different in magnitude from the others so that each produces a different deflection from the others in cathode ray tube 48, the sequence of resistors, for example, being related in accordance with the series $R$, $R/2$, $R/3$ . . . $R/m$. Likewise, all of the $R_y$ resistors in any given row are coupled through a suitable coupling capacitor 64 to an amplifier 66. The series of such amplifiers 66 is designated in the drawing as $Ay_1$, $Ay_2$ . . . $Ay_n$. The outputs of amplifiers 66 are directed through a series of pulse shapers 68 and a series of resistors 70 to the vertical deflection plates of cathode ray tube 48. Each of resistors 70 is different in magnitude from the others so that each produces a different deflection from the others in cathode ray tube 48, the sequence of resistors, for example, being related in accordance with the series $R$, $R/2$, $R/3$ . . . $R/n$. In operation, each detector can be considered as a source of charge or current The anode resistors are chosen so that the current from the detector will split evenly, half going to a $y$ amplifier and half going to an $x$ amplifier. The input impedance of each amplifier is very low compared with the input impedance of each detector. This arrangement allows most of current flowing in any of the $x$ or $y$ lines to go into the amplifier rather than to other points in the matrix. The amount of cross talk in the system is a function of relative values of the amplifier input impedance to the anode resistor impedance. If an event occurs in detector $x_1y_3$, for example, then amplifier $Ay_3$ and $Ax_1$ receive input signals simultaneously. The resulting simultaneous pulses are converted by the associated pulse shapers into pulses of standard amplitude and width. In FIG. 3, a dot is displayed on cathode ray tube screen 48 for each event measured by the detectors. The dots are placed on the screen in the same pattern as the events in the detectors of the array. Camera 50 serves to integrate successive pulses in the same location.

Figure 6:
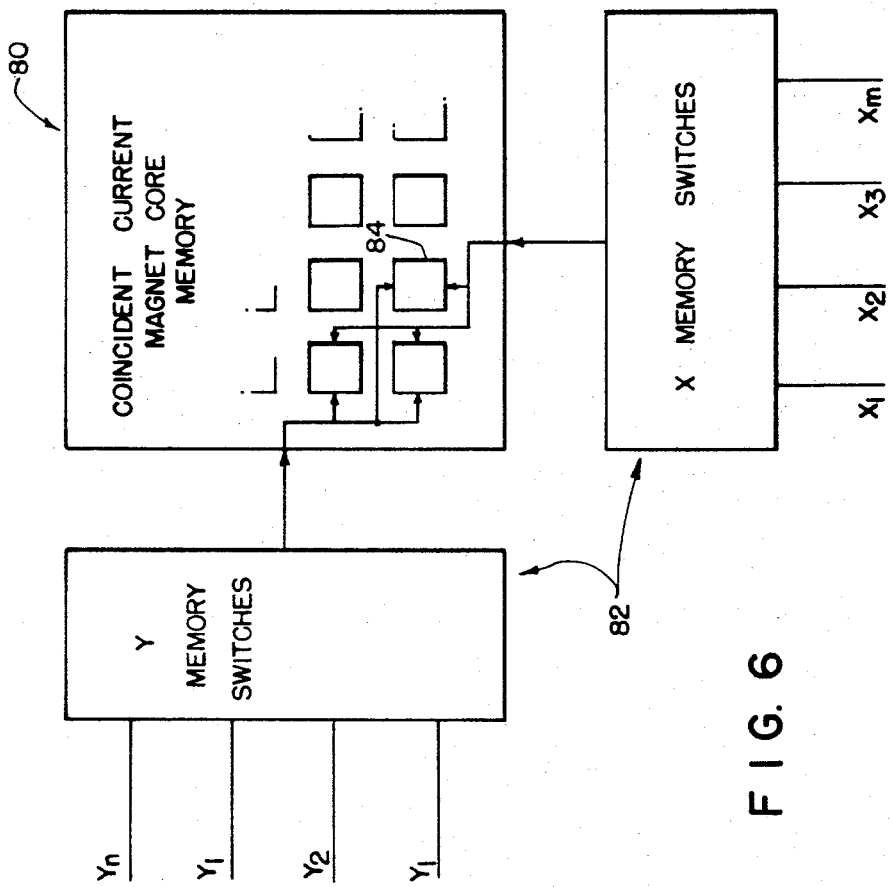
FIG. 6 is an alternative electrical schematic of a part of the system of FIG. 3.

Alternatively, in order to obtain quantitized data of counts per detector, a memory storage device in the form of coincident current magnetic core memory may be used as shown at 80 in FIG. 6. The input to the memory is provided with suitable circuitry (not shown) for rejecting a pulse generated in a second detector during recording and display of a pulse generated in a first detector in order to avoid error. The memory, which has as many storage locations 82, as there are detector elements is addressed from the pulse shapers by a coincident current arrangement 82. If pulse shapers $x_1$ and $y_3$ are triggered simultaneously then memory location $x_1y_3$ will be addressed. The data at this address is updated in a ring counter 84 or the like. At the end of an accumulation, the memory can be sequentially interrogated and its contents displayed on a cathode ray tube.

The present invention thus provides a novel technique for qualitative and quantitative detection radiating particles throughout a relatively wide area. Since certain changes may be made in the foregoing disclosure without departing from the scope of the invention here involved, it is intended that all matter described in the foregoing specification or shown in the accompanying drawing be interpreted in an illustrative and not in a limiting sense.

What is claimed is:

1. A detector array comprising a medial plate having a multiplicity of apertures therethrough, said medial plate being electrically conducting, an electrically insulating rearward plate having a multiplicity of depressions therein, said rearward plate being electrically nonconducting, said apertures and said depressions being registered, a forward plate capable of transmitting radiations incident thereon, the medial, rearward and forward plates providing a multiplicity of substantially isolated minute detecting chambers, a multiplicity of electrically conducting pins projecting through said rearward plate into said multiplicity of minute chambers, said multiplicity of minute chambers communicating with each other through ports, an ionizable gas within said chambers, a matrix of impedances operatively connected to said pins, and means for applying an electrical potential across said matrix and the walls of said apertures, said potential and said ionizable gas being so related that receipt of radiation in a selected one of said minute chambers causes an electrical discharge between the pin and the wall of said selected one of said chambers.

2. A detector system comprising: an array comprising a medial plate having a multiplicity of apertures therethrough, said medial plate being electrically conducting, a rearward plate having a multiplicity of depressions therein, said rearward plate being electrically nonconducting, said apertures and said depressions being registered, a forward plate capable of transmitting radiations incident thereon, the medial, rearward and forward plates providing a multiplicity of minute, substantially isolated, detecting chambers, said rearward plate having channels to provide ports between said chambers, a multiplicity of pins projecting through said rearward plate into said multiplicity of chambers, each of said multiplicity of chambers communicating with all others of said chambers through said ports, an ionizable gas within said chambers, an electrical matrix connected to the rows and columns of pins of said array, electrical potential means for causing discharge between the pin of a selected chamber when energized with incident radiation, and indicating means responsive to said matrix for generating a signal corresponding to said selected chamber.

3. In the system of claim 2, means for continuously circulating said gas through said conduits.

4. In the system of claim 2, said electrical potential means applying an electrical potential across said pins and the walls of said apertures.

5. In the system of claim 2, said medial plate being metal.

6. In the system of claim 2, said rearward plate being plastic.

7. In the system of claim 2, means for recording the number of events in any detecting chamber by photointegration.

8. In the system of claim 2, means for recording the number of events in any detecting chamber by a magnetic memory.

9. In the system of claim 2, an electronic coincidence circuit for locating the positions of events from said detectors utilizing an X and Y coordinate array where there is the summing and coincidence of signals from rows and columns to determine the position of such events.

10. In the system of claim 2, a coincidence circuit that inhibits the recording and display of erroneous data by ignoring a pulse produced in a second detector while processing a pulse produced in a first detector.

11. A detector comprising base means providing a planar array of substantially, mechanically isolated chambers, means providing ports interconnecting said chambers so that each of said chambers communicates with all others of said chambers, said base means including electrical insulating portions and electrically conducting portions, an array of pins carried by said insulating portions and projecting into said chambers such that a single pin projects into a single chamber and such that the spatial relationships between the pin and portions of each chamber are substantially identical to the spatial relationships between the pin and portions of the other chambers, said electrically conducting portions of all of said chambers communicating electrically, an ionizable gas within said chambers, said base means providing ports between said chambers so that each of said chambers communicates with all others of said chambers in order to maintain said ionizable gas at the same pressure in all of said chambers, electrical matrix means connected to said pins, electrical potential means for causing discharge between the pins of a selected chamber when energized with incident radiation, and indicating means responsive to said matrix for generating a signal corresponding to any discharge between the pin and the electrically conducting portions of any selected chamber.

12. The detector of claim 11, wherein said matrix includes a series of rows of X outputs and a series of columns of Y outputs, the pin of any chamber being electrically connected through an impedance to one of said X outputs and one of said Y outputs, a series of X amplifiers electrically connected to said series of X outputs, and a series of Y amplifiers electrically connected to said series of Y outputs.

13. The detector of claim 12, wherein are provided means for recording the number of events in any of said chambers, said last mentioned means including a cathode ray tube operatively connected to said X amplifiers and said Y amplifiers, and photointegrating means.

14. The detector of claim 12, wherein a magnetic memory is operatively connected to said X amplifiers and said Y amplifiers.

15. The detector of claim 12 wherein is provided an electronic coincidence circuit for locating the positions of said events in response to signals received from said X amplifiers and said Y amplifiers.

References Cited

UNITED STATES PATENTS

| 2,677,780 | 5/1954 | Rees et al. | 313—93 |
| 2,692,948 | 10/1954 | Lion | 313—93 X |
| 2,699,513 | 1/1955 | Watt | 313—93 |
| 3,004,165 | 10/1961 | Minowitz et al. | 250—83.6 |
| 3,234,386 | 2/1966 | Leventhal et al. | 250—83.3 |

RALPH G. NILSON, *Primary Examiner.*

S. ELBAUM, *Assistant Examiner.*

U.S. Cl. X.R.

250—83; 313—93